United States Patent [19]

Matsumoto et al.

[11] Patent Number: 5,818,588
[45] Date of Patent: Oct. 6, 1998

[54] DISPLACEMENT MEASURING METHOD AND APPARATUS USING PLURAL LIGHT BEAM BEAT FREQUENCY SIGNALS

[75] Inventors: Takahiro Matsumoto; Koichi Sentoku, both of Utsunomiya, Japan

[73] Assignee: Canon Kabushiki Kaisha, Tokyo, Japan

[21] Appl. No.: 962,680

[22] Filed: Nov. 3, 1997

Related U.S. Application Data

[63] Continuation of Ser. No. 492,417, Jun. 19, 1995, abandoned.

[30] Foreign Application Priority Data

Jun. 20, 1994 [JP] Japan .................................. 6-137406

[51] Int. Cl.$^6$ ........................................................ G01B 9/02
[52] U.S. Cl. ........................... 356/349; 356/363; 356/358
[58] Field of Search .................................. 356/351, 349, 356/363, 358

[56] References Cited

U.S. PATENT DOCUMENTS

| | | |
|---|---|---|
| 3,790,284 | 2/1974 | Baldwin . |
| 4,912,530 | 3/1990 | Bessho . |
| 5,204,535 | 4/1993 | Mizutani ................................ 356/349 |
| 5,321,502 | 6/1994 | Matsumoto et al. ................... 356/349 |

FOREIGN PATENT DOCUMENTS

| | | |
|---|---|---|
| 0536655 | 4/1993 | European Pat. Off. . |
| 209006 | 3/1990 | Japan . |

*Primary Examiner*—Robert Kim
*Attorney, Agent, or Firm*—Fitzpatrick, Cella, Harper & Scinto

[57] ABSTRACT

A displacement measuring method for measuring displacement of an object to be examined is disclosed, wherein light which contains two components having a small difference in frequency is separated into a first light of a firs wavelength and a second light of a second wavelength, having different frequencies. First light beam of the first light and a second light beam of the second light interfere with each other, wherein at least one of the first and second light beams is directed via the object, whereby a first light beat signal is produced. Third light beam of the first light and a fourth light beam of the second light interfere with each other, wherein at least one of the third and fourth light beams is directed via the object, whereby a second light beat signal having a predetermined phase difference as compared with the first light beat signal is produced. Then, displacement of the object is measured on the basis of a phase resulting from comparison of the phases of the first and second light beat signals.

6 Claims, 12 Drawing Sheets

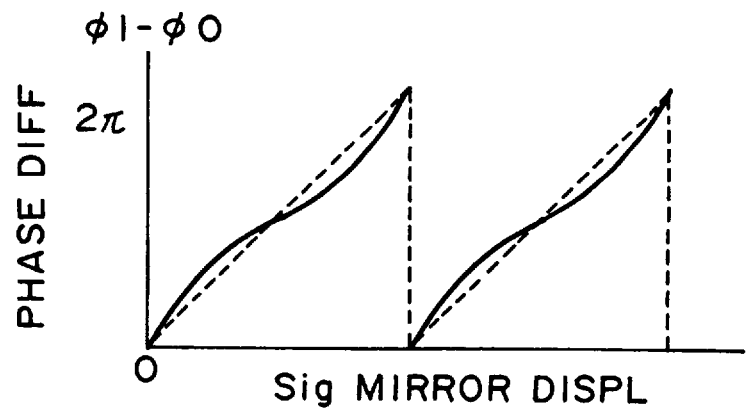
F I G. 7A
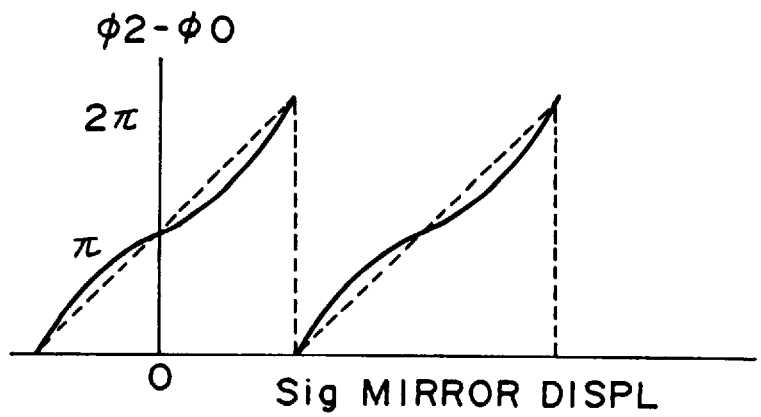
F I G. 7B
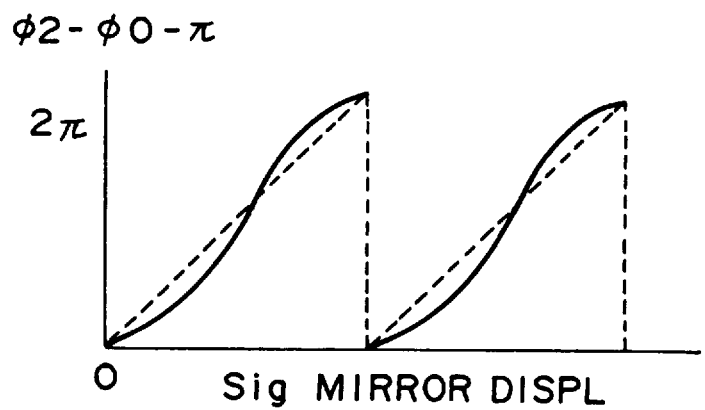
F I G. 7C

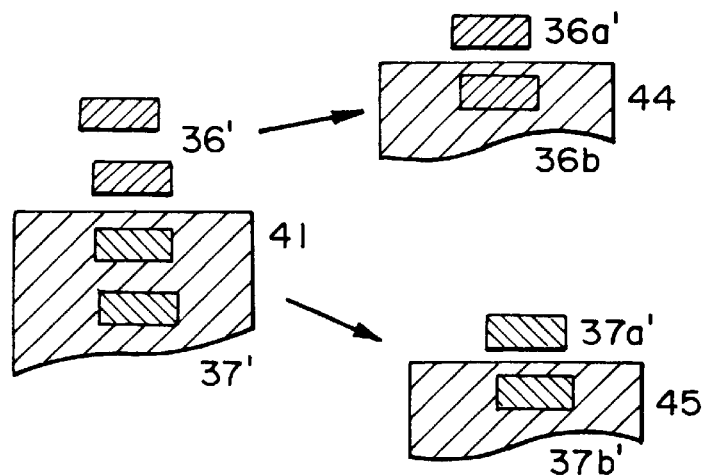
F I G. 11
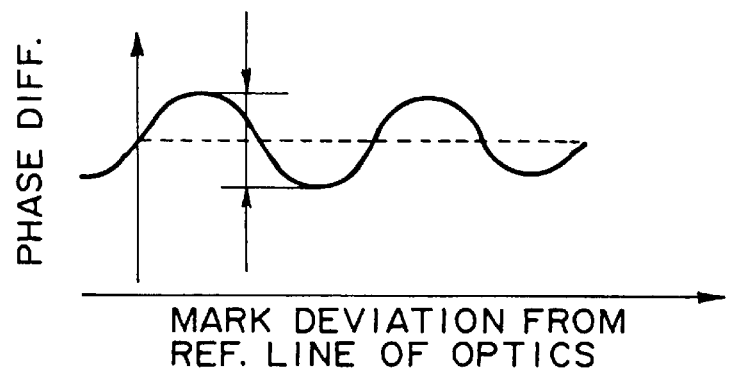
F I G. 12A
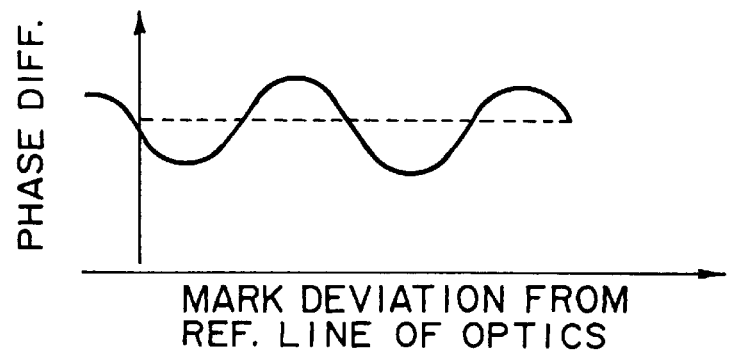
F I G. 12B

DISPLACEMENT MEASURING METHOD AND APPARATUS USING PLURAL LIGHT BEAM BEAT FREQUENCY SIGNALS

This application is a continuation of application Ser. No. 08/492,417, filed Jun. 19, 1995, now abandoned.

FIELD OF THE INVENTION AND RELATED ART

This invention relates to a displacement measuring method and apparatus suitably applicable to a measuring apparatus which uses a method based on optical heterodyne interference measurement, such as a minute displacement measuring apparatus, an alignment apparatus, a printing registration evaluating apparatus, a distance measuring apparatus, for example.

For high precision measurement of minute displacement, in many cases, heterodyne interference method has been used which method is able to detect phase information of light being in a linear relationship with a displacement, through phase detection.

In optical heterodyne interference method, interference light which is produced by two lights having a small difference in frequency and which changes with time is photoelectrically detected, and the phase of interference fringe is transformed into a phase of electric signal.

FIG. 1 illustrates an example of minute displacement measuring apparatus having a light source of Zeeman laser 301, wherein an interferometer system is provided by using two linearly polarized lights 302 and 303, being perpendicular to each other and having a small difference in frequency.

The light 302 comprises P-polarized light of a frequency $f_1$ whose electric vector slightly oscillates within the sheet of the drawing. The light 303 comprises S-polarized light of a frequency $f_2$, whose electric vector slightly oscillates within a plane normal to the sheet of the drawing. The complex amplitude expressions $E_1$ and $E_2$ of the lights 302 and 303 emitted by the Zeeman laser 301 can be written, if $\phi_1$ and $\phi_2$ are respective initial phases, as follows:

$$E_1 = A \exp\{i(w_1 t + \phi_1)\} \quad (1)$$

$$E_2 = B \exp\{i(w_2 t + \phi_2)\} \quad (2)$$

where A and B are amplitudes and $w_1$ and $w_2$ are angular frequencies, wherein $w_1 = 2\pi f_1$ and $w_2 = 2\pi f_2$.

Each of the lights 302 and 303 is amplitude divided by a beam splitter 304, such that reference light 306 (307) corresponding to the light 303 (302) is produced on one hand and, on the other hand, signal light 315 (316) corresponding to the light 303 (302) is produced which light enters the interferometer.

Here, a polarizer 305 effective to extract a polarized component inclined by 45 deg. with respect to the direction of polarization of light, serves to provide registration in direction of polarization between the reference lights 306 and 307. Photoelectric detector 317 then detects the lights 306 and 307. The two complex amplitude expressions $E_{1R}$ (amplitude of light 307) and $E_{2R}$ (amplitude of light 306) can be written as follows, if the optical path length from the light source 301 to the beam splitter 304 is $L_S$ and that from the beam splitter 304 to the detector 317 is $L_0$ and when $A_1$ and $B_2$ denote amplitudes, respectively:

$$E_{1R} = A_1 \exp[i\{w_1 t + \phi_1 - K_1(L_S + L_0)\}] \quad (3)$$

$$E_{2R} = B_1 \exp[i\{w_2 t + \phi_2 - K_2(L_S + L_0)\}] \quad (4)$$

wherein $K_1$ and $K_2$ are wave numbers where, if C is speed of light, $K_1 = 2\pi f_1/C$ and $K_2 = 2\pi f_2/C$; and wherein $w_1$ and $w_2$ are angular frequencies where $w_1 = 2\pi f_1$ and $w_2 = 2\pi f_2$.

Since the two reference lights have their polarization directions registered by the polarizer 305, they interfere with each other. The resultant interference light is detected by the photoelectric detector 317. Then, an AC component detection signal IR is provided:

$$IR = 2A_1 B_1 \cos\{(w_1 - w_2)t + (\phi_1 - \phi_2) + (K_2 - K_1)(L_S + L_0)\} \quad (5)$$

On the other hand, the light passed through the beam splitter 304 impinges on a polarization beam splitter 308. S-polarized light is reflected thereby and then is reflected by a mirror 310, such that it is directed back to the polarization beam splitter 308. Here, the light passes twice a quarter wave plate 309 which is placed on the light path, so that the direction of polarization rotates by $\pi/2$ revolution and the light is P-polarized light. Therefore, it passes through the polarization beam splitter 308.

On the other hand, P-polarized light impinging on the polarization beam splitter 308 passes through the same and is reflected by an object 312 to be measured, back to the polarization beam splitter 308. Similarly, here, tie light passes twice a quarter wave plate 311 disposed on the light path, such that the direction of polarization rotates by $\pi/2$ revolution and the light is S-polarized light. Therefore, the light is reflected by the polarization beam splitter 308. Thereafter, the polarization directions of the S-polarized signal light and the P-polarized signal light are registered by means of a polarizer 314 and are detected by a photoelectric detector 318. When $A_2$ and $B_2$ are their amplitudes, $L_1$ is the optical path length for the light from the beam splitter 304 and, after being reflected by the mirror 310, to the photoelectric converter 318, and $L_1 + 2\Delta L$ is the optical path length for the light from the beam splitter 304 and, after being reflected by the object 312, to the detector 318, then the complex amplitude expressions $E_{1S}$ and $E_{2S}$ of the respective lights at the photoelectric detector 318 can be written as follows (where $\Delta L$ is the amount of displacement of the object 312):

$$E_{1S} = A_2 \exp[i\{w_1 t + \phi_1 - K_1(L_S + L_1 + 2\Delta L)\}] \quad (6)$$

$$E_{2S} = B_2 \exp[i\{w_2 t + \phi_2 - K_2(L_S + L_1)\}] \quad (7)$$

Of the interference signal of these lights, AC component IS is given by:

$$IS = 2A_2 B_2 \cos\{(w_1 - w_2)t(\phi_1 - \phi_2) + (K_2 - K_1)(L_S + L_1) - 2K_1 \Delta L\} \quad (8)$$

The difference $\Delta\phi = \phi_R - \phi_S$ in phase between the heat signals as represented by equations (5) and (8) is measured by a lock-in amplifier (synchronism detector) 319. Regarding the phase difference $\phi$, since under ordinary interference conditions a change of $(K_2 - K_1)(L_S + L_1)$ can be disregarded, $\Delta\phi = 2K_1 \Delta L$. Thus, it changes linearly with a change of $\Delta L$. Therefore, it is possible to detect a displacement $\Delta L$ of the object very precisely, by detecting the phase difference $\Delta\phi$.

As another example of measuring apparatus based on optical heterodyne interference method, FIG. 2 illustrates a positional deviation detecting system for a diffraction grating (Japanese Laid-Open Patent Application, Laid-Open No. 90006/1990, for example). In this system, laser light from a dual wavelength orthogonal polarization laser (Zeeman laser) 140 is bisected into lights of two wavelengths by means of a polarization beam splitter 142, and the lights are projected to one or more diffraction gratings (here, 171–173 in FIG. 3). From diffraction lights produced by the diffraction gratings, light beat signals are produced. By detecting and comparing phases of the beat signals, the position of that diffraction grating or any relative positional deviation between those diffraction gratings is detected very precisely. Thus, such system is used in alignment systems of many semiconductor exposure apparatuses.

Due to incompleteness of orthogonality of polarization of laser light or incompleteness of optical parts, however, generally polarization is disturbed. Thus, polarized lights and frequencies do not correspond to each other completely. As a result, the measured phase and the optical path difference to be measured are not in a simple linear relationship, and this leads to an error in the interference measurement.

This will be explained in more detail by reference to FIG. 1. The lights 315 ($E_{2S}$) and 316 ($E_{1S}$) transmitted through or reflected by the polarization beam splitter 308 are, in an exact sense, as follows:

$$E_{1S}=Aexp[i\{w_1t+\phi_1-K_1(L_S+L_1+2\Delta L)\}]+\alpha exp[i\{w_2t+\phi_2-K_2(L_S+L_1+2\Delta L)\}] \quad (9)$$

$$E_{2S}=Bexp[i\{w_2t+\phi_2-K_2(L_S+L_1)\}]+\beta exp[i\{w_1t+\phi_1-K_1(L_S+L_1)\}] \quad (10)$$

wherein $\alpha$ and $\beta$ are values each corresponding to crosstalk, and it is represented that light of component $w_2$ leaks by $\alpha/A$ into the path of light $w_1$ (light of component $w_1$ leaks by $\beta/B$ into the path of light $w_2$). If $\gamma$ is amplitude, the signal IAC to be detected practically by a phase meter, for example, is expressed as follows:

$$IAC=\gamma \cos\{(w_1-w_2)t+(\phi_1-\phi_2)+\Delta\phi\} \quad (11)$$

$$\tan\Delta\phi=\sin(2K_2\Delta L)/\{\cos(2K_2\Delta L)+(\alpha/B+\beta/A)\} \quad (12)$$

Namely, to a change of $\Delta L$, the measured phase $\Delta\phi$ changes at a period of $\pi/K_2$.

FIG. 4 illustrates results of calculation for measured values, produced from a phase change to displacement an object to be measured, in an example of leakage 0.1% (intensity ratio). Broken line corresponds to a case without leakage. The difference (measurement error) is large, of an order of several ten nanometers.

If a He—Ne laser is used to provide an interferometer system, in order to reduce the error to not larger than 1 nm, the quenching ratio of the polarization beam splitter has to be not greater than 0.01%. It is difficult to produce a polarization beam splitter that satisfies such quenching ratio.

On the other hand, in a case where plural diffraction gratings are used for the positional deviation detection, as shown in FIG. 2, due to the effect of leakage of light at a polarization beam splitter, the phase changes non-linearly to a displacement of a diffraction grating. This results in degradation of measurement reproducibility.

In an attempt to reducing such non-linear error, a balanced detection method has been proposed in Japanese Laid-Open Patent Application, Laid-Open No. 259407/1990 or in "Applied Physics", Vol. 58, No. 10 (1989), pp 89.

According to this method, in place of the polarizer 314, a polarization separating element 320 being tilted by $\pi/4$ radian about the axis of input light, such as illustrated in FIG. 5, is used to produce a sum component and a differential component of two signals, which are then applied to detectors 321 and 322, respectively. Then, an output of a differential amplifier 323 is applied to a phase difference meter 319. In this manner, the non-linear component is reduced. Practically, however, due to incompleteness of a light source and optical parts related to polarization, it is not easy to fix the polarization plane and to provide complete alignment of the polarization separating element 320 about the optical axis. Further, there is leakage of light produced by the polarization separating element 320 itself. Thus, it is not possible to completely remove the non-linear error.

SUMMARY OF THE INVENTION

It is an object of the present invention to provide a high-precision displacement measuring method and apparatus by which at least one of the problems described above and peculiar to an optical heterodyne interference measurement system is solved.

In accordance with an aspect of the present invention, there is provided a displacement measuring method for measuring displacement of an object to be examined, said method comprising the steps of: separating light which contains two components having a small difference in frequency into a first light of a first wavelength and a second light of a second wavelength, having different frequencies; causing interference between a first light beam of the first light and a second light beam of the second light while directing at least one of the first and second light beams via the object, whereby a first light beat signal is produced; causing interference between a third light beam of the first light and a fourth light beam of the second light while directing at least one of the third and fourth light beams via the object, whereby a second light beat signal having a predetermined phase difference as compared with the first light beat signal is produced; and measuring displacement of the object on the basis of a phase resulting from comparison of the phases of the first and second light beat signals.

In a preferred form of this aspect of the present invention, the predetermined phase difference is $\pi$ radian.

In another preferred form of this aspect of the present invention, said measuring step includes detecting a sum of the first phase and a phase provided by adjusting the phase of the second light beat signal by an amount corresponding to the predetermined phase difference.

In a further preferred form of this aspect of the present invention, the method further comprises applying a phase difference to the third light beam and the fourth light beam, prior to producing the second light beat signal with the third and fourth light beams.

In a yet further preferred form of this aspect of the present Invention, the first and second light beams are directed via a first diffraction grating provided on the object, and wherein the third and fourth light beams are directed via a, second diffraction grating provided on the object and having the same pitch and the same array direction as of the first diffraction grating.

In a still further preferred form of this aspect of the present invention, the first and second diffraction gratings are formed with a mutual deviation in grating phase along the array direction.

In accordance with another aspect of the present invention, there is provided a displacement measuring system for measuring displacement of an object to be examined, said system comprising: a separating element for separating light which contains two components having a small difference in frequency into a first light of a firs wavelength and a second light of a second wavelength, having different frequencies; first photoelectric converting means for photoelectrically converting Interference light resulting from interference between a first light beam of the first light and a second light beam of the second light while directing at least one of the first and second light beams via the object, said first photoelectric converting means producing a first light beat signal; second photoelectric converting means for photoelectrically converting interference light resulting from interference between a third light beam of the first light and a fourth light beam of the second light while directing at least one of the third and fourth light beams via the object, said second photoelectric converting means producing a second light beat signal having a predetermined phase difference as compared with the first light beat signal; and means for measuring displacement of the object on the basis of a phase resulting from comparison of the phases of the first and second light beat signals.

In a preferred form of this aspect of the invention, the predetermined phase difference is $\pi$ radian.

In another preferred form of this aspect of the present invention, said measuring means includes means for detecting a sum of the first phase and a phase provided by adjusting the phase of the second light beat signal by an amount corresponding to the predetermined phase difference.

In a further preferred form of this aspect of the present invention, the system further comprises means for applying a phase difference to the third light beam and the fourth light beam, prior to producing the second light beat signal with the third and fourth light beams.

In a yet further preferred form of this aspect of the present invention, the first and second light beams are directed via a first diffraction grating provided on the object, and wherein the third and fourth light beams are directed via a second diffraction grating provided on the object and having the same pitch and the same array direction as of the first diffraction grating.

In a still further preferred form of this aspect of the present invention, the first and second diffraction gratings are formed with a mutual deviation in grating phase along the array direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A–7C are graphs for explaining offset adjustment for shifting the phase and characteristic of non-linear error by ½ period.

FIG. 11 is a schematic view for explaining how to separate diffraction light, in the third embodiment of FIG. 9.

FIGS. 12A and 12B are graphs for explaining inconveniences involved in a conventional structure and how they are solved in the third embodiment.

DESCRIPTION OF THE PREFERRED EMBODIMENTS

Figure 6:
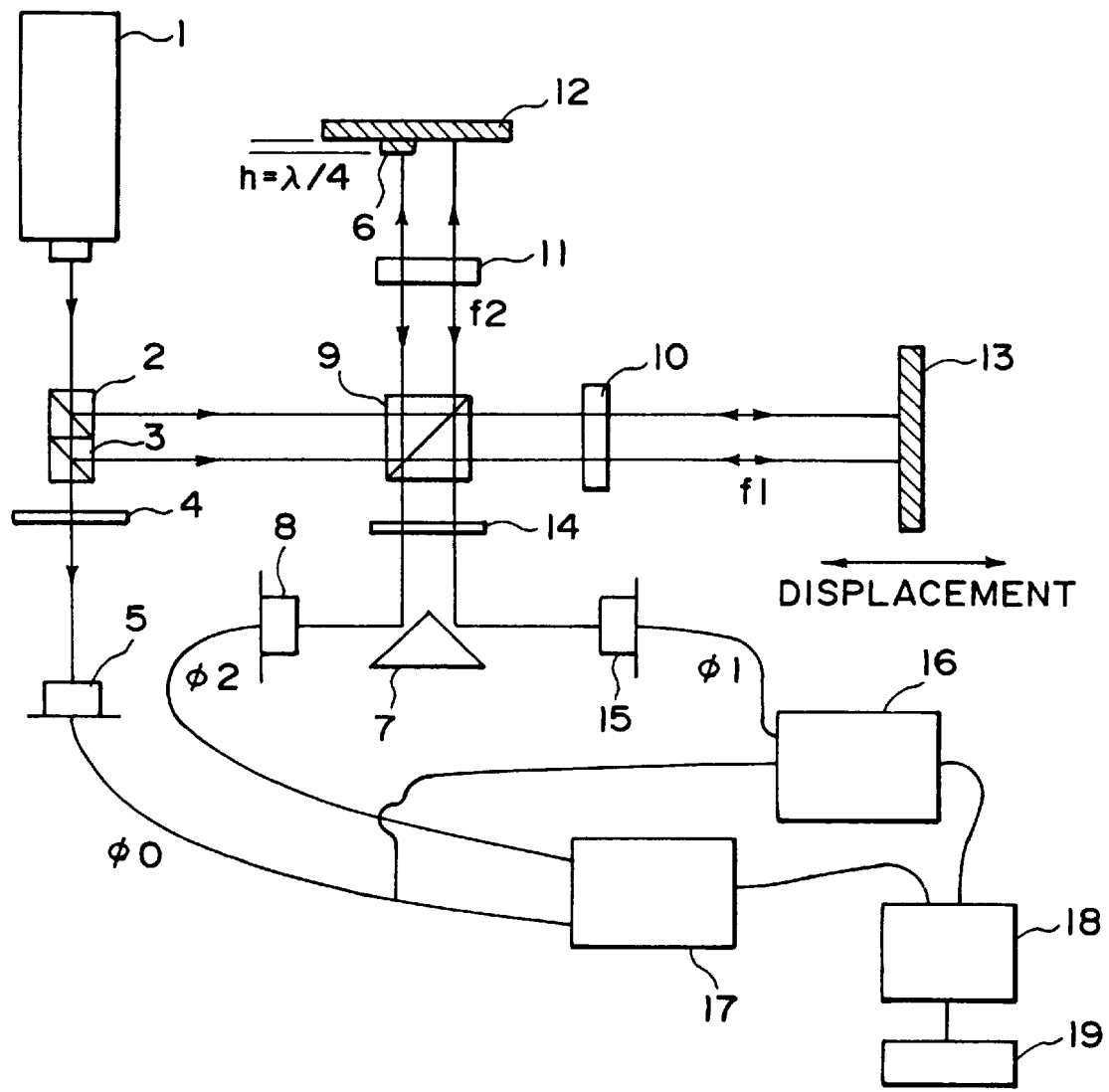
FIG. 6 is a schematic view of a minute displacement measuring system according to a first embodiment of the present invention, for explaining the basic concept of the present invention.

FIG. 6 shows a first embodiment of the present invention, which is applied to a minute displacement measuring system. Zeeman laser 1 produces lights of orthogonal polarization states (P-polarized light of a frequency $f_1$ and S-polarized light of a frequency $f_2$) which are bisected by a beam splitter 2 with their polarization components without being changed thereby. The light is further bisected by another beam splitter 3.

Light passing both of the two beam splitters 2 and 3 is received by a polarizer 4 by which the polarization directions of the components are registered. Thus, interference occurs. The interference light is transformed by a sensor 5 into an electric signal, whereby a reference beat signal is produced.

Light reflected by the beam splitter 2 impinges on a polarization beam splitter 9. Depending of the state of polarization, it is bisected into light of a frequency $f_1$ passing the beam splitter and light of a frequency $f_2$ reflected by the beam splitter. The light of frequency $f_1$ passed the polarization beam splitter 9 is reflected by a mirror 13 (object to be examined), and is projected on the polarization beam splitter 9. Here, the light passes twice through a quarter wave plate 10 disposed on the light path, such that, with rotation of the direction of polarization by 90 deg., the light is transformed into S-polarized light. Therefore, the light projected on the polarization beam splitter 9 is reflected thereby.

On the other hand, light of frequency $f_2$ reflected by the polarization beam splitter 9 is reflected by a fixed mirror 12 back again to the polarization beam spitter 9. Similarly, here, the light passes twice through a quarter wave plate 11 disposed on the light path. Thus, with rotation of the direction of polarization by 90 deg., the light is transformed into P-polarized light which now passes through the polarization beam splitter 9.

In the manner described above, lights of frequencies $f_1$ and $f_2$ advance along the same path. Polarizer 14 then registers the polarization directions, and interference occurs. The interference light is received by a sensor 15, whereby a first measurement beat signal is produced.

Light reflected by the polarization beam splitter 3 impinges on the polarization beam splitter 9. Depending on the state of polarization, it is bisected into light of a frequency $f_1$ passing the beam splitter and light of a frequency $f_2$ reflected by the beam splitter. The light of frequency $f_1$ passed the polarization beam splitter 9 is reflected by the mirror 13 (object to be examined), and is projected on the polarization beam splitter 9. Here, the light passes twice through a quarter wave plate 10 disposed on the light path, such that, with rotation of the direction of polarization by 90 deg., the light is transformed into S-polarized light. Therefore, the light projected on the polarization beam splitter 9 is reflected thereby.

On the other hand, light of frequency $f_2$ reflected by the polarization beam splitter 9 is reflected by a step portion 6 of the fixed mirror 12 back again to the polarization beam splitter 9. Similarly, here, the light passes twice through the quarter wave plate 11 disposed on the light path. Thus, with rotation of the direction of polarization by 90 deg., the light is transformed into P-polarized light which now passes through the polarization beam splitter 9.

In the manner described above, lights of frequencies $f_1$ and $f_2$ advance along the same path. The polarizer 14 then registers the polarization directions, and interference occurs. The interference light is received by the sensor 8, whereby a second measurement beat signal is produced.

Here, if the step 6 changes; the phases of the first and second measurement beat signals change. For example, if the height h of the step is set to satisfy $h=\pi/4$ where $\lambda$ is the wavelength of light used, a phase difference of $\pi$ radian is produced between the two beat signals. In a case where a He—Ne laser is used, the step is of about 158 nm, and it may be formed easily and accurately by a known method such as vapor deposition, for example. Separation of two measurement beat signals may be done by using a prism mirror 7, for example.

An example of signal processing method will be explained below. Detecting the phase difference ($\phi_1-\phi_0$) between a measurement beat signal 1 and a reference beat signal through a phase difference meter 16, it changes with displacement of the mirror 13 in the manner such as illustrated in FIG. 7A. Also, detecting the phase difference ($\phi_2-\phi_1$) between a measurement signal 2 and the reference beat signal through a phase difference meter 17, a signal having its phase shifted by $\pi$ such as illustrated in FIG. 7B is produced. Comparing FIGS. 7A and 7B, it is seen that there is also a shift $\pi$ of the phase of the non-linear error component. Outputs of the phase difference meters 16 and 17 are applied to an operational device 18. In this operational device 18, first, offset adjustment by $-\pi$ radian is performed to the output level of the phase difference meter 17, so that the phase difference changes with displacement of the mirror 13 as illustrated in FIG. 7C. After this conversion, the operational device calculates the sum $\phi$ with the phase difference output of the phase difference meter 16. Here, the non-linear component has been reduced. If the amount of displacement of the mirror is $\Delta L$ and the wave number of the laser used is K, $\phi=4K\Delta L$. Thus, by performing an operation $\phi/(4K)$ with the operational device 18, the amount of mirror displacement is detectable. The result of operation is applied to a display 19, and the amount of displacement is displayed.

The beat signal processing method described above is merely an example. What is important is that in the present invention a particular note is paid to the phenomenon that the non-linear error has a periodic repetition characteristic and, based on this finding, an additional phase difference output having a non-linear error component shifted by a half of the period is produced. The phase difference detection may be done to appropriate two of the three beat signals. The operational processing method described above is an example, and any other method may be used.

As regards the step h to be formed on the mirror 12, it is not limited to $\pi/4$. A height N times $\pi/4$ (N is an odd number) may be applicable, including a case where the step is concave. Also, the step may be formed on the measurement mirror side.

Figure 8:
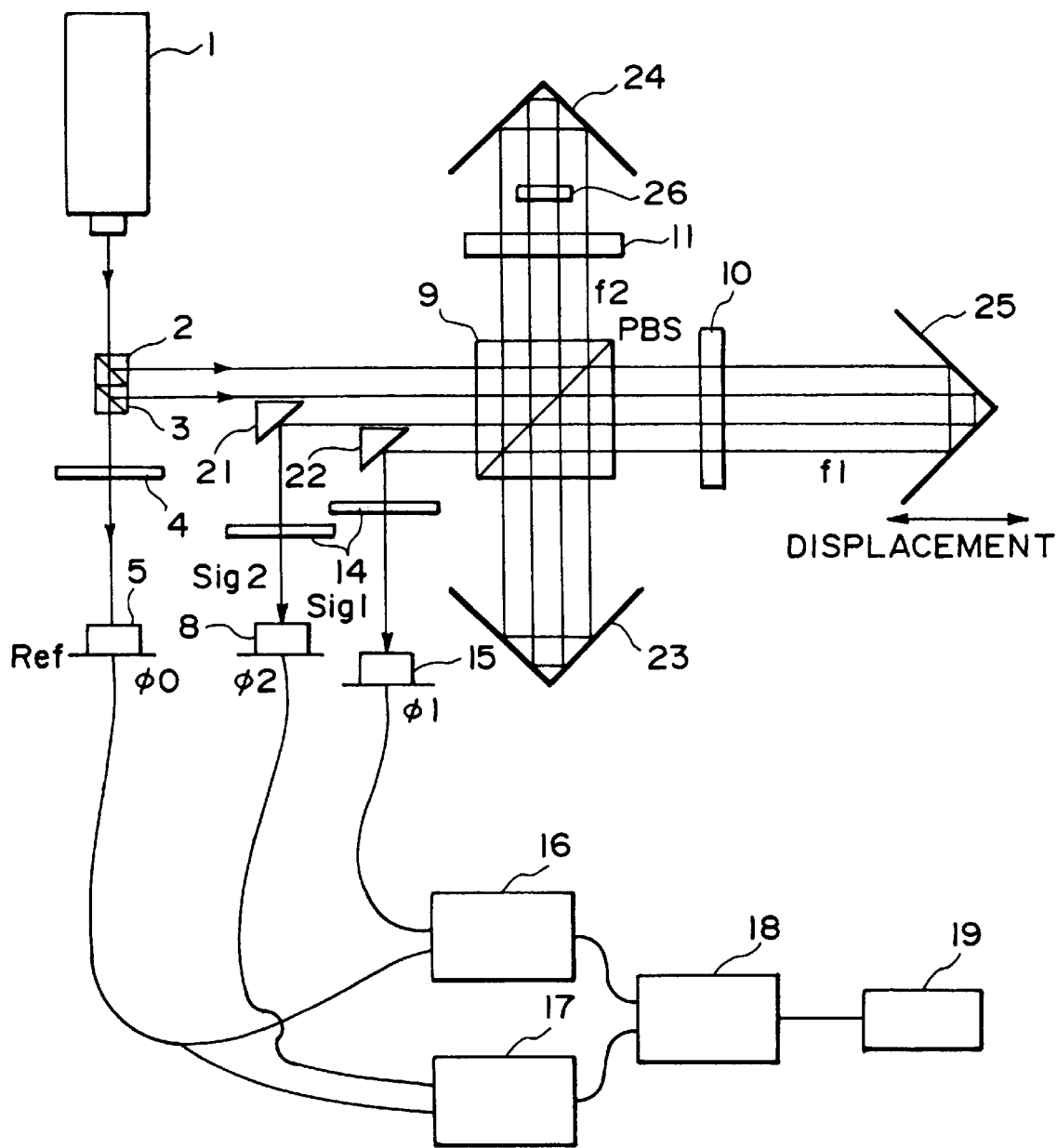
FIG. 8 is a schematic view of a double-path type minute displacement measuring system according to a second embodiment of the present invention.

The present invention is widely applicable to heterodyne interference measuring apparatuses. The first embodiment has been described particularly with reference to an interferometer, representative one of them. Next, the manner of applying a difference of ½ period to the non-linear error characteristic, between two phase difference outputs, as well as the applicability to other apparatuses, will be described FIG. 8 illustrates a second embodiment of the present invention which is applied to a measuring apparatus for measuring displacement of an object, as in the first embodiment. Like numerals as of the first embodiment of FIG. 6 are assigned to corresponding or similar elements of FIG. 8, having corresponding or similar functions. In FIG. 6, plane mirrors are used. In this embodiment, however, corner cube prisms (23, 24, 25) are used. Since the principle is substantially the same as that of the first embodiment, detailed description will be omitted here. Because of use of cornier cube prism, the sensitivity to a displacement of an object on which the corner cube prism is mounted becomes higher, twice as high as that of the FIG. 6 embodiment. Further, while in the FIG. 6 embodiment a tilt of the mirror (object to be examined) leads to an error, in the FIG. 8 embodiment any tilt of the corner cube priest 25 (object to be examined) does not cause an error.

In this embodiment, a parallel flat plate 26 is used to produce a shift of ½ period in the non-linear error characteristic. As regards the thickness t of the parallel plate, if this interferometer is placed in an atmosphere, the refractive index of the air to the used wavelength $\lambda$ is 1 and the refractive index of the parallel plate 26 is n, then it may be set to satisfy the following condition:

$$t=m\cdot\lambda/\{4(n-1)\} \tag{13}$$

(m is an odd number)

Processing the beat signal may be performed essentially in the same way as of the first embodiment. However, because the sensitivity to a displacement $\Delta L$ is twice, the last operation to be done in the operational device 18 is $\phi/8K$ (K is wave number).

Figure 9:
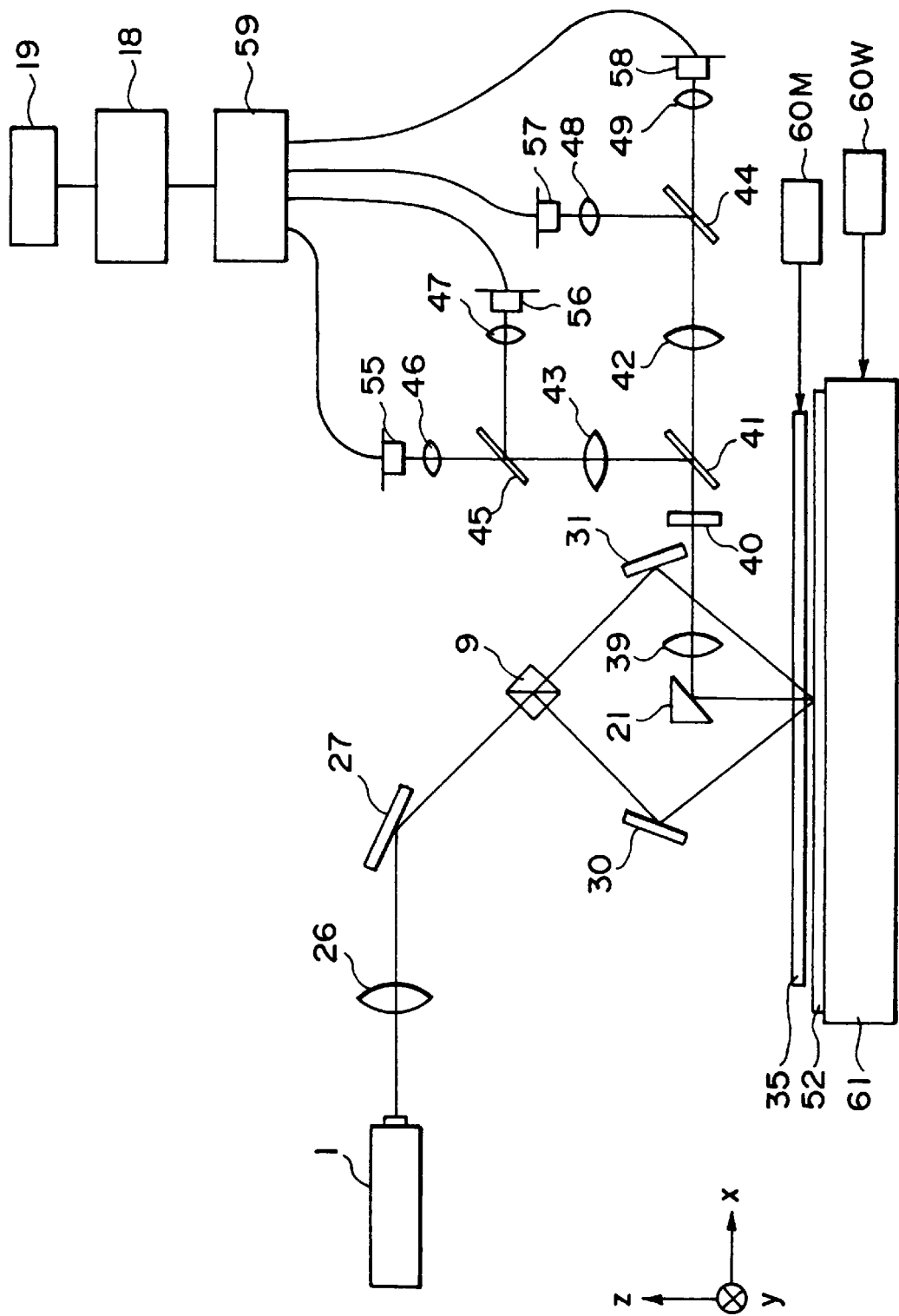
FIG. 9 is a schematic view of an alignment system in a semiconductor exposure apparatus, according to a third embodiment of the present invention.

FIG. 9 illustrates a third embodiment of the present Invention which is applied to an alignment system in a semiconductor exposure apparatus of proximity exposure type, using deep ultraviolet light or X-rays, for example. Alignment operation to a mask 35 and a wafer 52 is performed by using an alignment mark 36 of the mask 35, comprising a diffraction grating or gratings, and an alignment mark 37 of the wafer 35, comprising a diffraction grating or gratings. Zeeman laser 1 produces light having orthogonally intersecting polarization states. The light goes through a collimator lens 26 and it is deflected by a mirror 27. Then, it is bisected by a polarization beam splitter 9 into a component of frequency $f_1$ (S-polarized light) and a component of frequency $f_2$ (P-polarized light). The light of frequency $f_1$ is deflected by a mirror 30 and it is projected on the alignment marks 36 and 37, at a predetermined angle. Also, the light of frequency $f_2$ is deflected by a mirror 31 and, similarly, it is projected on the alignment marks 36 and 37. Here, the mirrors 30 and 31 are arranged to set an incidence angle $\theta_{in}$ so that diffraction light is being diffracted perpendicularly to and upwardly from the wafer (mask). Where the pitch of the diffraction grating of alignment mark 36 (37) is P, the used wavelength is $\lambda$ and the order of diffraction is first order, then the incidence angle may be determined as follows:

$$\sin \theta_{in}=\lambda/P \qquad (14)$$

For example, if the pitch P is 2 micron and a He—Ne laser (633 nm) is used, the incidence angle is about 18.5 deg.

Figure 10:
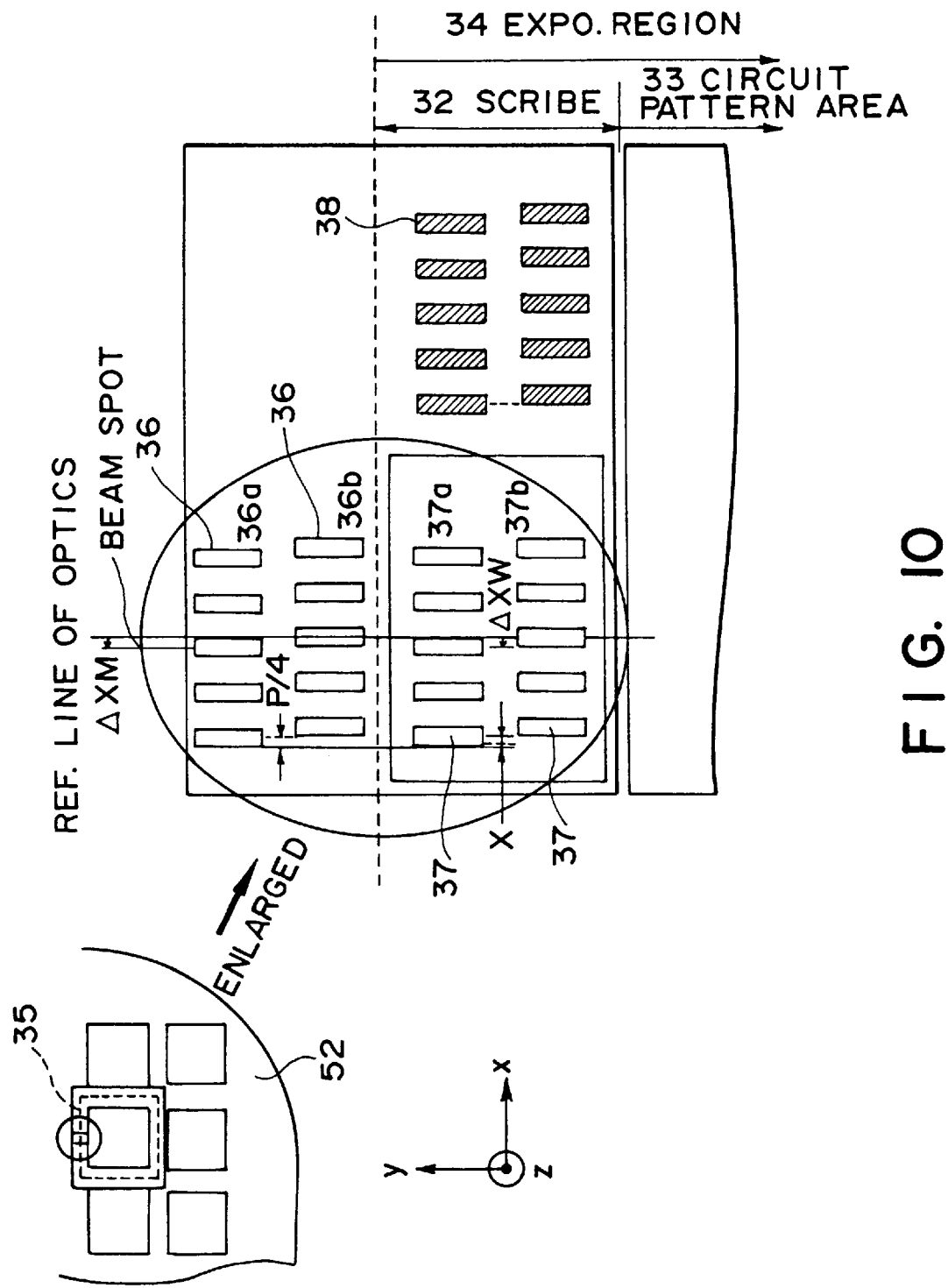
FIG. 10 is a schematic view for partially illustrating a mask, a wafer and alignment marks to be used in the third embodiment of FIG. 9.

As best seen in FIG. 10, the alignment marks 36 and 37 each comprises two sets of diffraction gratings 36a (37a) having a mutual shift of ¼ pitch. Also, there is a small shift in the Y direction. Further, the marks 36 and 37 have a shift in the Y direction. The portion of the mask 35 corresponding to the mark 37, is equipped with a transmitting area. The other area to be irradiated with alignment light has such a mask structure effective to block the alignment light to thereby prevent production of unwanted light. In FIG. 10, the mark on the mask denoted at 38 is a mark which is going to be printed on the wafer so that the printed mark will be used in the subsequent exposure process. A region denoted at 32 corresponds to a scribe line, and a region denoted at 33 corresponds to a circuit pattern area, a region denoted at 34 corresponds to the range to be irradiated with the exposure light.

Diffraction lights from the alignment marks 36 and 37 go along substantially the same path, and they are reflected by a mirror 21. Then the lights pass through a lens 39 and a polarizer 40, and the marks 36 and 37 are imaged at the position of an edge mirror 41 such as illustrated in FIG. 11. Here, the diffraction light from the alignment mark 36 passes the edge mirror and, as shown in FIG. 6, again it is re-imaged at the edge mirror 44 position. Thus, the diffraction light is divided into diffraction light from the diffraction grating 36a and diffraction light from the diffraction grating 37b. The divided diffraction light goes through a collecting lens 49 or 48, and it is photoelectrically detected by a sensor 58 or 57. On the other hand, the diffraction light from the alignment mark 37 as reflected by the edge mirror 41 is similarly divided into diffraction light from the diffraction grating 37b and diffraction light from the diffraction grating 37a. Thereafter, they are detected by sensors 56 and 57, respectively.

With respect to the lens 39, the wafer 52 (mask 36) and the edge mirror 41 are placed in an optically conjugate relationship. Additionally, the edge mirror 41 is optically conjugate with the sensors 55–58. Namely, the wafer (mask) is in an optically conjugate relationship with the sensors. Thus, the system is stiff against tilt of the wafer and the mask.

Beat signal IMa being photoelectrically detected by the sensor 55, if $\alpha$ and $\beta$ are amplitudes of leakage lights to the amplitudes A and B of regular reflection light and regular transmission light of the polarization been splitter 9 and if AM is the amplitude, is such as follows:

$$IMa=AM \cos \{(w_1-w_2)t+\Delta\phi M\} \qquad (15)$$

$$\tan (\Delta\phi M)=\sin (4\pi\Delta XM/P)/\{\cos (4\pi\Delta XM/P)+(\alpha/B+\beta/A)\} \qquad (16)$$

wherein $\Delta XM$ is the amount of deviation of the alignment mark 36a from a reference line, and P is the pitch of the alignment mart 36.

Also, the beat signal IMb being photoelectrically detected by the sensor 58 is such as follows:

$$IMb=AM \cos \{(w_1-w_2)t+\Delta\phi M'\} \qquad (17)$$

$$\tan (\Delta\phi M')=\sin (4\pi\Delta XM/P+\pi)/\{\cos (4\pi\Delta XM/P+\pi)+(\alpha/B+\beta/A)\} \qquad (18)$$

On the other hand, the beat signal IWa bring photoelectrically detected by the sensor 57, if $\alpha$ and $\beta$ are amplitudes of leakage light to the amplitudes A and B of regular reflection light and regular transmission light of the polarization beam splitter 9 and if AW is the amplitude, is such as follows:

$$IWa=AW \cos \{(w_1-w_2)t+\Delta\phi W\} \qquad (19)$$

$$\tan (\Delta\phi W)=\sin (4\pi\Delta XW/P)/\{\cos (4\pi\Delta XW/P)+(\alpha/B+\beta/A)\} \qquad (20)$$

wherein $\Delta XW$ is the amount of deviation of the alignment mark 37a from a reference line, and P is the pitch of the alignment mark 37.

Also, the beat signal IWb being photoelectrically detected by the sensor 56 is such as follows:

$$IWb=AW \cos \{(w_1-w_2)t+\Delta\phi W'\} \qquad (21)$$

$$\tan (\Delta\phi W')=\sin (4\pi\Delta XW/P+\pi)/\{\cos (4\pi\Delta XW/P+\pi)+(\alpha/B+\beta/A)\} \qquad (22)$$

Here, the difference of the beat signals represented by equations (15) and (19), that is, $\Delta\phi M-\Delta\phi W$, is detected by a dual-channel phase difference meter 59. Even when the relative positional deviation between the alignment marks 36 and 37 is constant, as illustrated in FIG. 12A, this phase difference signal changes along a sine curve at a period P/2 with a positional deviation between the reference line of the alignment optical system and the alignment marks 36 and 37, in the alignment direction (in other words, a deviation between the beam spot and the alignment mark). In exposure apparatuses, alignment marks should be renewed sequentially and the alignment optical system has to be moved sequentially with the renewal. Conventionally, there has been no suitable device for positioning the beam spot and the alignment mark with such precision (e.g. not greater than P/5). As a result, an alignment error corresponding to the amplitude shown in FIG. 12A occurs. Other factors for causing such error may be a positioning error, for example, in respect to the mask chucking position.

Taking the phase difference $\Delta\phi M'-\Delta\phi W'$ between the beat signals expressed by equations (17) and (21) through the phase difference meter 59, a signal with a characteristic having a non-linear error shifted by ½ period, such as shown in FIG. 12B, is provided. Thus, by detecting an average ø of these two phase difference signals by use of the operational device 18, it is possible to cancel the non-linear error. Here, the relative positional deviation $\Delta X$ of the mask and the wafer can be determined by $\Delta X=\phi \cdot P/(4\pi)$.

After detection of the positional deviation, a drive signal corresponding to the deviation is applied from an unshown driver to an actuator 60M, for driving the mask 35, and/or to an actuator 60W, for driving the wafer stage 61, to move one of or both of the mask and the water so that the positional error comes into a tolerable range.

While the foregoing description has been made with respect to one axis (X direction), it is also with the case of the Y direction. That is, additional sets of alignment marks (not shown) are provided on the mask and the wafer, in the direction perpendicular to the X-direction alignment marks, and an additional set of optical system (also not shown) is provided in respect to a direction perpendicular to the X-axis detection direction. The detection itself may be done essentially in the same manner as that in the X-direction. A diffraction grating of diced pattern may be used as an alignment mark and, in that occasion, positional deviation detection both in respect to the X and Y direction is possible. Further, alignment optical systems and alignment marks each such as described above may be provided on at least three sides of the four sides of each exposure region and, in that occasion, detection of positional deviation in the X and Y directions as well as detection of a positional deviation in a rotational direction are enabled.

In the present embodiment, P-polarized light and S-polarized light are projected on a diffraction grating and, after being diffracted thereby, the polarization directions are registered by means of a polarizer. However, a half wave plate may be disposed on one of the path of the light transmitted through the polarization beam splitter 9 and the path of the light reflected by this beam splitter, for registration of the polarization direction, and after that these lights may be projected to the alignment mark. In that occasion, the polarizer 40 is riot necessary.

While the present embodiment has been described with reference to an example where positive and negative first order diffraction lights are used, any other order diffraction lights may be used. Where positive and negative n-th order diffraction lights are to be used, two diffraction grating of an alignment mark may have a positional deviation corresponding to ¼n of the pitch, so as to assure a shift of the non-linear error characteristic of ½ period.

Figure 13:
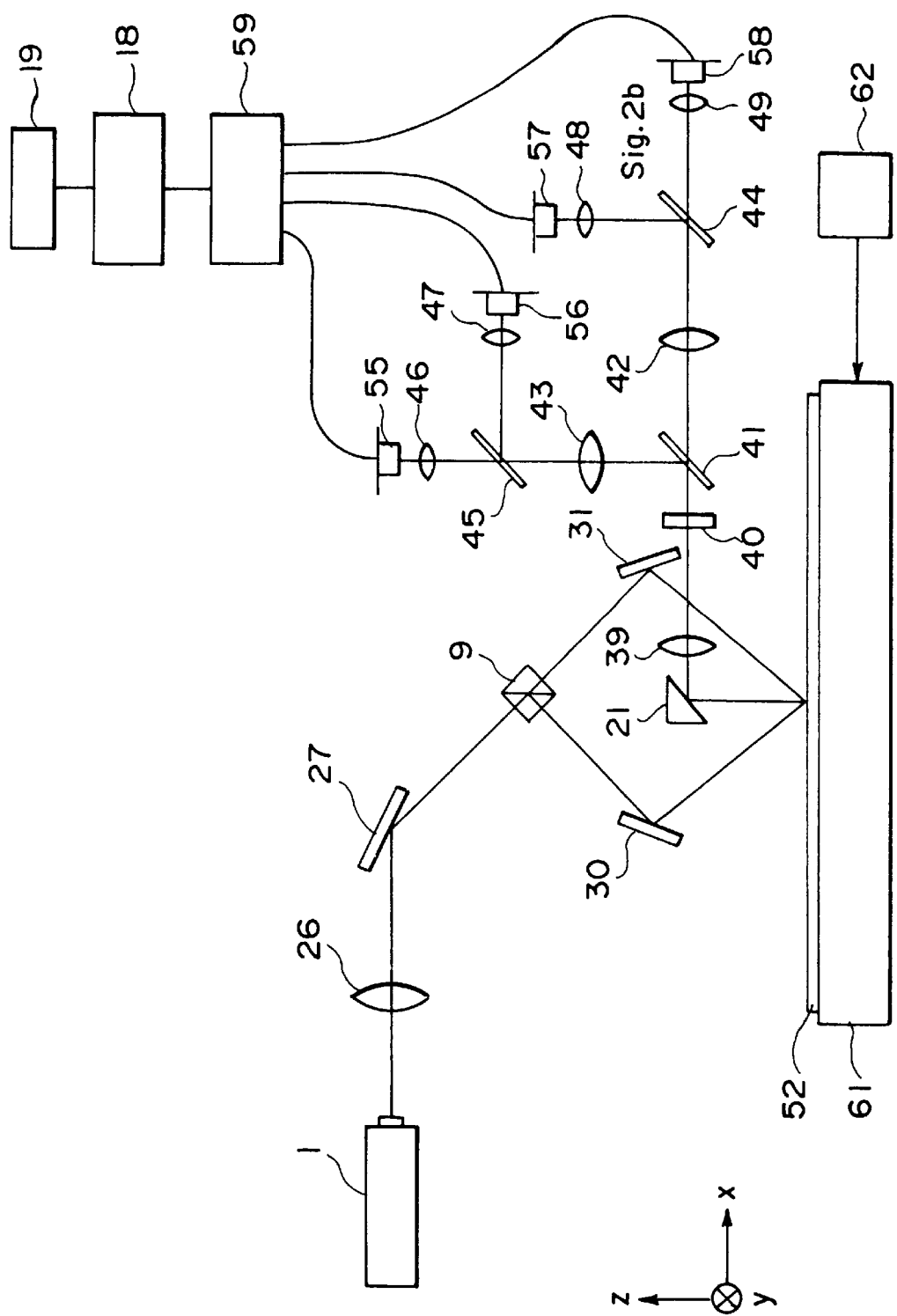
FIG. 13 is a schematic view of a registration precision measuring system according to a fourth embodiment of the present invention.

FIG. 13 shows a fourth embodiment of the present invention, which is applied to a printing registration precision evaluating system for detecting and evaluating the positional deviation, at high precision, between two printing registration evaluation patterns having been printed through two exposure processes. In FIG. 13, like numerals as of the preceding embodiments are assigned to corresponding elements.

Figure 14:
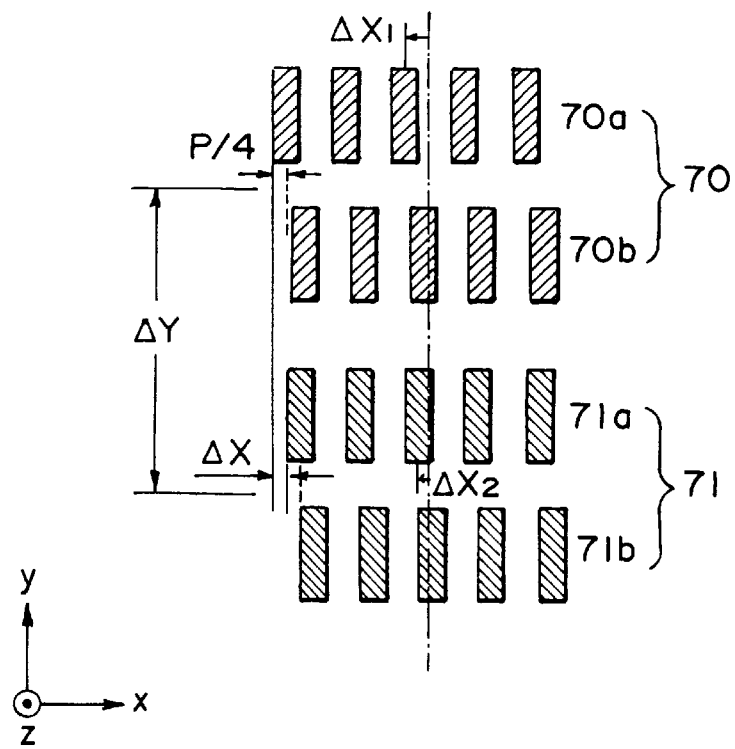
FIG. 14 is a schematic view of an example of evaluation pattern used in the fourth embodiment of FIG. 13.

Wafer 52 has, As best seen in FIG. 14, two evaluation patterns 70 and 71 each comprising diffraction gratings. These patterns are formed through separate printing processes, and they are juxtaposed to each other with a spacing ΔY. Light from a Zeeman laser 1, having orthogonal polarization states, is bisected by a polarization beam splitter 9 into light of a frequency $f_1$ (S-polarized light) and light of a frequency $f_2$ (P-polarized light). The light of frequency $f_1$ goes via a mirror 30 and irradiates the evaluation patterns 70 and 71. The light of frequency $f_2$ is deflected by a mirror 31 and, similarly, it irradiates the diffraction gratings. Here, the mirrors 30 and 31 are adapted to set the incidence angle $\theta_{in}$ so that the diffraction light is being diffracted upwardly and perpendicularly from the wafer. The incidence angle can be determined in accordance with equation (14) above, if the pitch of the diffraction grating of the evaluation pattern 70 (71) is P.

As best seen in FIG. 14, the evaluation patterns 70 and 71 each comprises two sets of diffraction gratings having a mutual shift of ¼ pitch. Also, there is a small shift in the Y direction. Symbol ΔX in the drawing corresponds to the registration error between two processes Diffraction lights from the evaluation patterns 70 and 71 go along substantially the same path. Substantially in the same manner, diffraction light from the diffraction grating 70a and diffraction light from the diffraction grating 70b are collected by condensing lenses 49 and 48, respectively, and then are photoelectrically detected by sensors 58 and 57, respectively. On the other hand, the diffraction light from the evaluation pattern 71, as reflected by an edge mirror 41, is divided into diffraction light from the diffraction grating 71b and diffraction light from the diffraction grating 71a. They are then detected by sensors 56 and 55, respectively.

Beat signal $I_{1a}$ being photoelectrically detected by the sensor 55, if α and β are amplitudes of leakage lights to the amplitudes A and B of regular reflection light and regular transmission light of the polarization beam splitter 9 and if $A_1$ is the amplitude, is such as follows:

$$I^{1a} = A_1 \cos\{(w_1 - w_2)t + \Delta\phi_1\} \qquad (23)$$

$$\tan(\Delta\phi_1) = \sin(4\pi\Delta X_1/P)/\{\cos(4\pi\Delta X_1/P) + (\alpha/B + \beta/A)\} \qquad (24)$$

wherein $\Delta X_1$ is the amount of deviation of the diffraction grating 70a from a reference line, and P is the pitch of the diffraction grating 70.

Also, the beat signal $I_{1b}$ being photoelectrically detected by the sensor 58 is such as follows:

$$I_{1b} = A_1 \cos\{(w_1 - w_2)t + \Delta\phi_1'\} \qquad (25)$$

$$\tan(\Delta\phi_1') = \sin(4\pi\Delta X_1/P + \pi)/\{\cos(4\pi\Delta X_1/P + \pi) + (\alpha/B + \beta/A)\} \qquad (26)$$

On the other hand, the beat signal $I_{2a}$ being photoelectrically detected by the sensor 57, if α and β are amplitudes of leakage light to the amplitudes A and B of regular reflection light and regular transmission light of the polarization beam splitter 9 and if $A_2$ is the amplitude, is such as follows:

$$I_{2a} = A_2 \cos\{(w_1 - w_2)t + \Delta\phi_2\} \qquad (27)$$

$$\tan(\Delta\phi_2) = \sin(4\pi\Delta X_2/P)/\{\cos(4\pi\Delta X_2/P) + (\alpha/B + \beta/A)\} \qquad (28)$$

wherein $\Delta X_2$ is the amount of deviation of the diffraction grating 71a from a reference line, and P is the pitch of the diffraction grating 71.

Also, the beat signal $I_{2b}$ being photoelectrically detected by the sensor 56 is such as follows:

$$I_{2b} = A_2 \cos\{(w_1 - w_2)t + \Delta\phi_2'\} \qquad (29)$$

$$\tan(\Delta\phi_2') = \sin(4\pi\Delta X_2/P + \pi)/\{\cos(4\pi\Delta X_2/P + \pi) + (\alpha/B + \beta/A)\} \qquad (30)$$

Here, the difference of the beat signals represented by equations (23) and (27), that is, $\Delta\phi_1 - \Delta\phi_2$, is detected by a dual-channel phase difference meter 59. Even when the relative positional deviation between the evaluation patterns 70 and 71 is constant (namely, the same registration error), as illustrated in FIG. 12A, this phase difference signal changes along a sine curve at a period P/2 with a positional deviation between the reference line of the optical system and the evaluation patterns 70 and 71 (in other words, a deviation between the beam spot and the evaluation pattern). In registration measuring systems, it is necessary to perform measurement of registration error at various sites in a shot of a wafer. Also, it is necessary to perform measurement with respect to various shots on a wafer. Thus, the wafer has to be moved to place each evaluation pattern at the measurement position. Conventionally, there has been no suitable device for positioning the beam spot and the evaluation pattern with such precision (e.g. not greater than P/5). As a result, an error of measurement reproducibility corresponding to the amplitude shown in FIG. 12A occurs.

Taking the phase difference $\Delta\phi_1' - \Delta\phi_2'$ between the beat signals expressed by equations (25) and (29) through the phase difference meter 59, a signal with a characteristic having a non-linear error shifted by ½ period, such as shown in FIG. 12B, is provided. Thus, by detecting an average ø of these two phase difference signals by use of the operational device 18, it is possible to cancel the non-linear error. Here, the relative positional deviation ΔX of the mask and the wafer can be determined by:

$$\Delta X = \phi \cdot P/(4\pi) \qquad (31)$$

Figure 15:
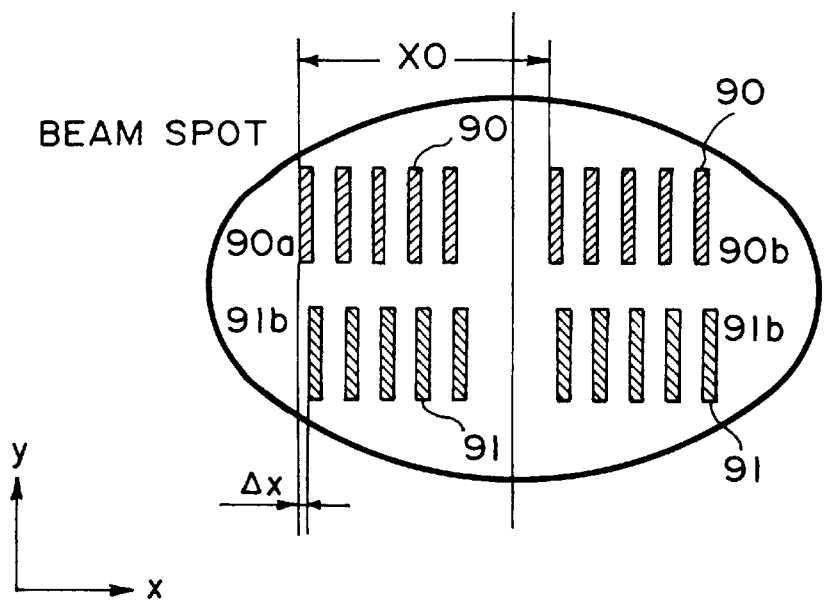
FIG. 15 is a schematic view, illustrating another example of pattern array.

Other than the pattern arrangements of the third and fourth embodiments, an arrangement shown in FIG. 15 may be used, wherein diffraction gratings 90a and 90b and diffraction gratings 91a and 91b of marks 90 and 91 have a mutual shift $X_0$ in the X direction. However, there is a necessity of shifting the non-linear error by ½ period, if the pitch of the diffraction grating is P and n is an integer, the amount of shift may be selected in the range of $X_0=(2n+1) \cdot P/4$.

While in the foregoing description the invention has been described with reference to examples where a Zeeman laser is used as a light source, as a matter of course a monofrequency laser may be used: laser light from such laser may divided by a polarization beam splitter and, thereafter, an acousto-optic element may be used to perform frequency modulation thereto, whereby two light beams of different frequencies and having orthogonal polarization states are provided.

While the invention has been described with reference to the structures disclosed herein, it is not confined to the details set forth and this application is intended to cover such modifications or changes as may come within the purposes of the improvements or the scope of the following claims.

What is claimed is:

1. A displacement measuring method for measuring displacement of an object to be examined, said method comprising the steps of:

separating light which contains two components having a small difference in frequency into a first light of a first wavelength and a second light of a second wavelength, having different frequencies;

causing interference between a first light beam of the first light and a second light beam of the second light while directing at least one of the first and second light beams via the object, whereby a first light beat signal is produced;

applying a phase difference to a third light beam of the first light and a fourth light beam of the second light;

causing interference between the third light beam of the first light and the fourth light beam of the second light while directing at least one of the third and fourth light beams via the object, whereby a second light beat signal having a predetermined phase difference of π radians as compared with the first light beat signal is produced; and determining displacement of the object on the basis of an average of (i) the phase of the first light beat signal and (ii) the Phase of the second light beat signal having been adjusted by an amount corresponding to a predetermined phase difference of π radians.

2. A method according to claim 1, wherein the first and second light beams are directed via a first diffraction grating provided on the object, and wherein the third and fourth light beams are directed via a second diffraction grating provided on the object and having the same pitch and the same array direction as of the first diffraction grating.

3. A method according to claim 2, wherein the first and second diffraction gratings are formed with a mutual deviation in grating phase along the array direction.

4. A displacement measuring system for measuring displacement of an object to be examined, said system comprising:

a separating element for separating light which contains two components having a small difference in frequency into a first light of a first wavelength and a second light of a second wavelength, having different frequencies;

first photoelectric converting means for photoelectrically converting interference light resulting from interference between a first light beam of the first light and a second light beam of the second light while directing at least one of the first and second light beams via the object, said first photoelectric converting means producing a first light beat signal;

means for applying a phase difference to a third light beam of the first light and a fourth light beam of the second light;

second photoelectric converting means for photoelectrically converting interference light resulting from interference between the third light beam of the first light and the fourth light beam of the second light while directing at least one of the third and fourth light beams via the object, said second photoelectric converting means producing a second light beat signal having a predetermined phase difference of π radians as compared with the first light beat signal; and means for detecting displacement of the object on the basis of an average of (i) the phase of the first light beat signal and (ii) the phase of the second light beat signal having been adjusted by an amount corresponding to a predetermined phase difference of π radians.

5. A system according to claim 4, wherein the first and second light beams are directed via a first diffraction grating provided on the object, and wherein the third and fourth light beams are directed via a second diffraction grating provided on the object and having the same pitch and the same array direction as of the first diffraction grating.

6. A system according to claim 5, wherein the first and second diffraction gratings are formed with a mutual deviation in grating phase along the array direction.

* * * * *

UNITED STATES PATENT AND TRADEMARK OFFICE
CERTIFICATE OF CORRECTION

PATENT NO. : 5,818,588

DATED : October 6, 1998

INVENTOR(S): TAKAHIRO MATSUMOTO ET AL.  Page 1 of 3

It is certified that error appears in the above-identified patent and that said Letters Patent is hereby corrected as shown below:

ON COVER PAGE AT [57] ABSTRACT

Line 4, "firs" should read --first--.

SHEET 3

Figure 1:
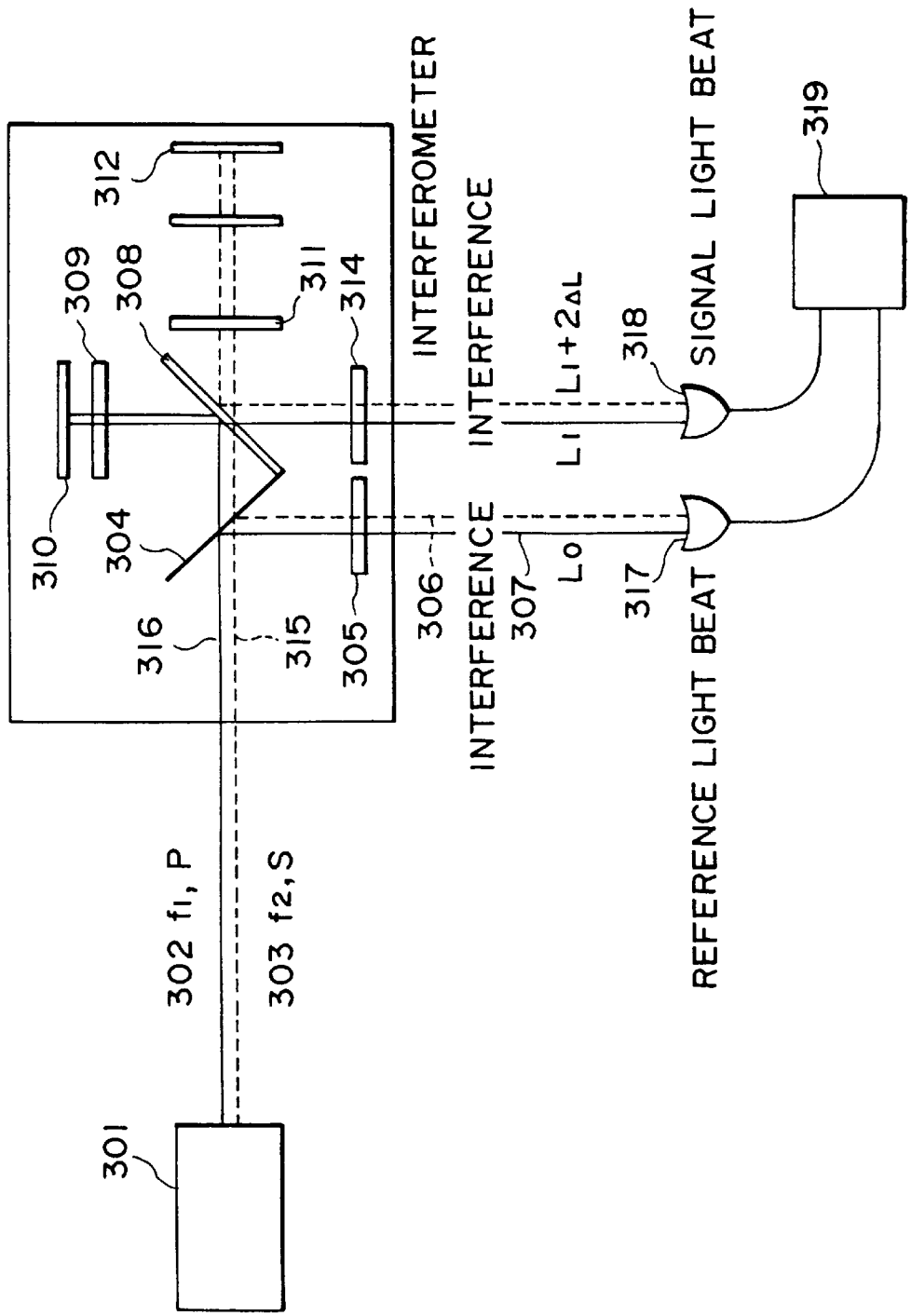
FIG. 1 is a schematic view of a known type minute displacement measuring apparatus.
Figure 2:
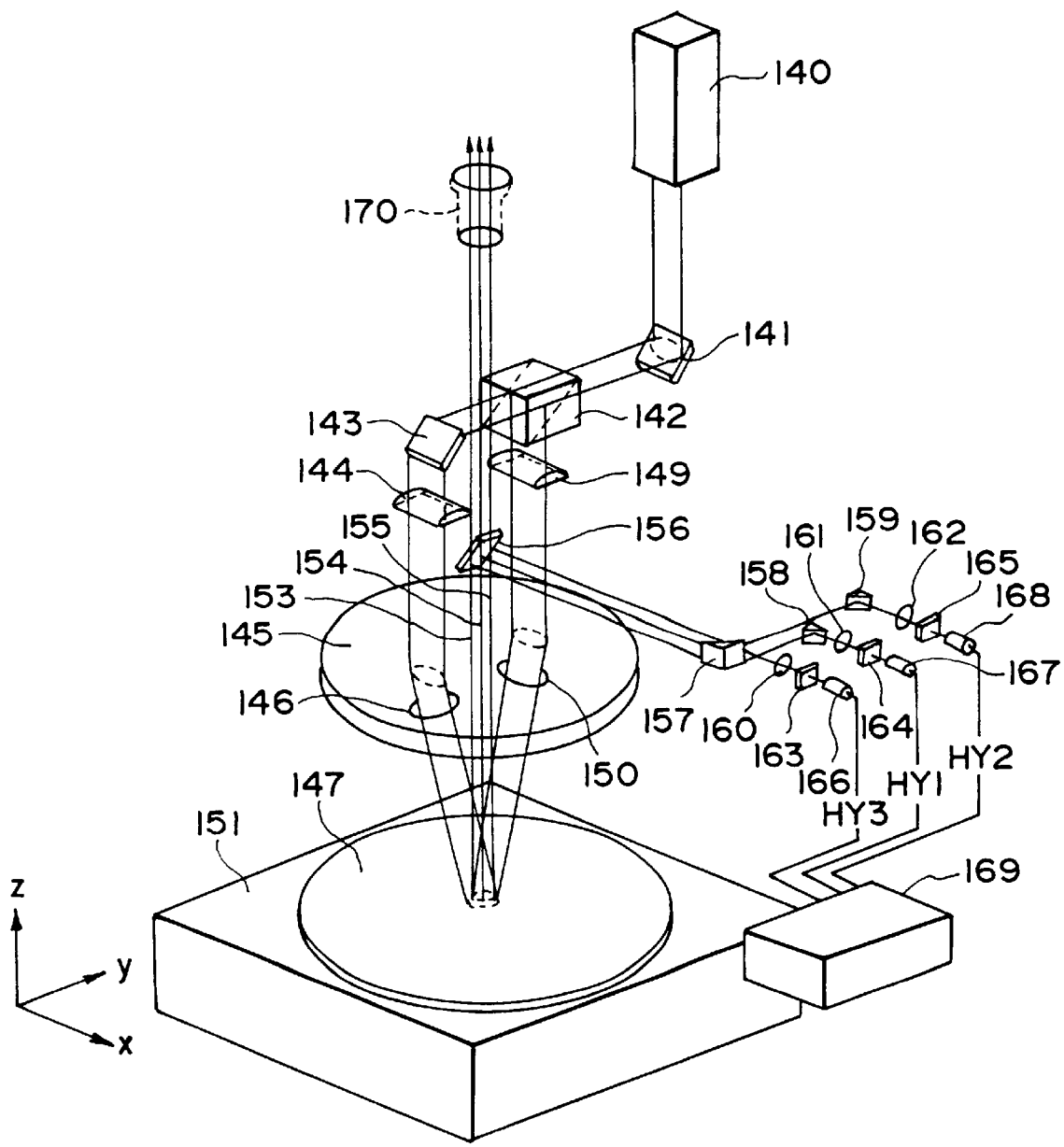
FIG. 2 is a perspective view of a known type registration precision measuring apparatus.
Figure 3:
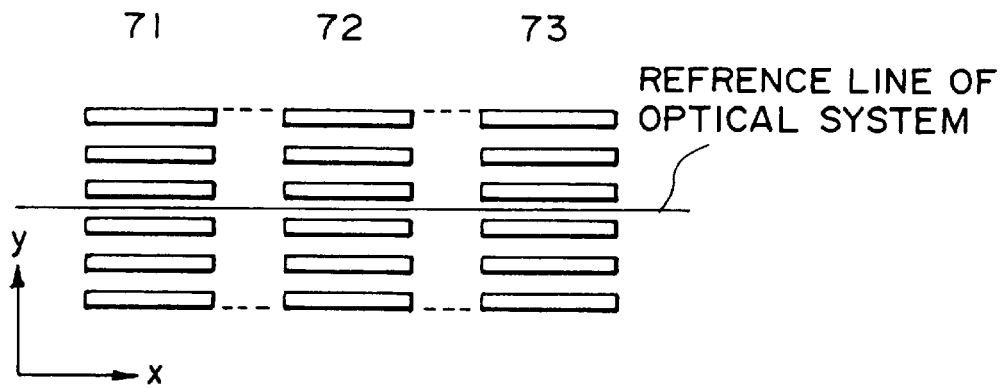
FIG. 3 is a schematic view of pattern array in the apparatus of FIG. 2.
Figure 4:
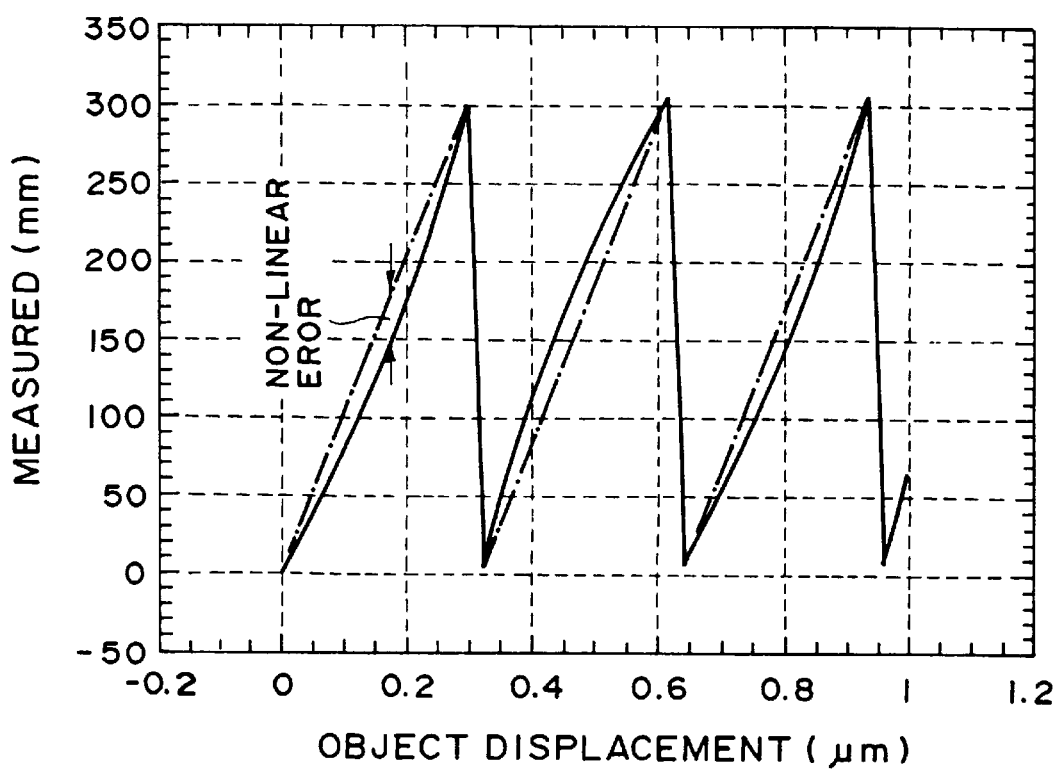
FIG. 4 is a graph for explaining non-linear error in a conventional system.
Figure 5:
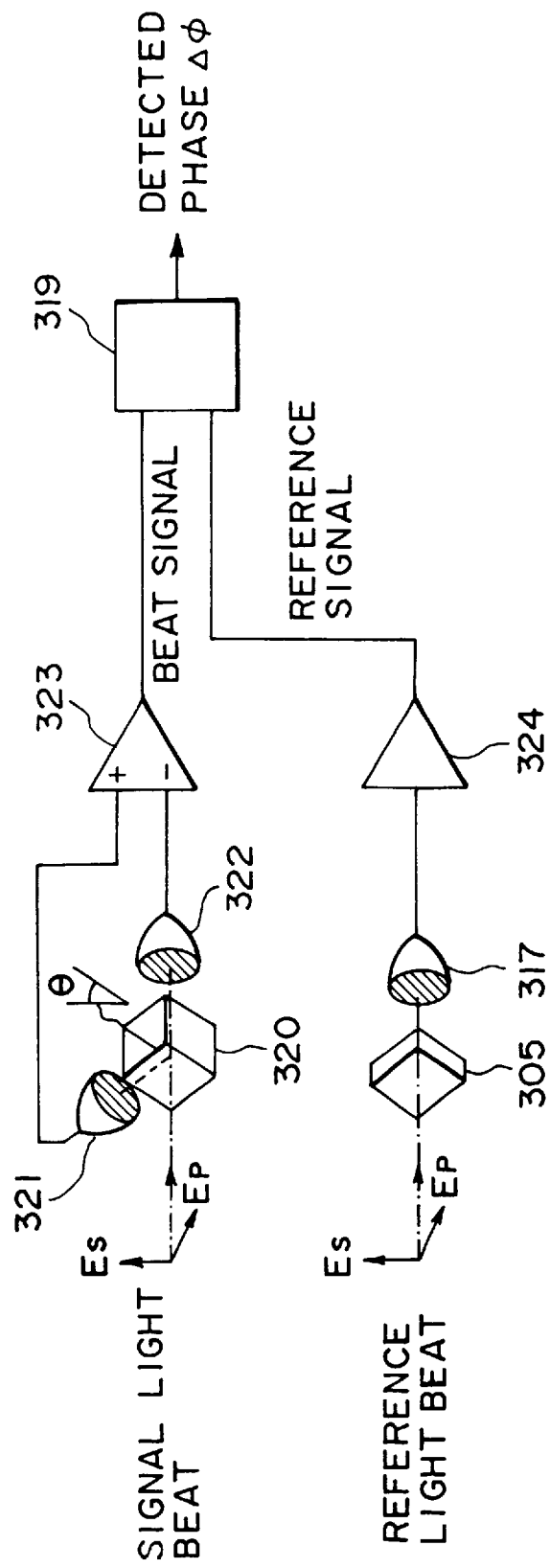
FIG. 5 is a schematic view for explaining how to reduce the non-linear error in the conventional system.

Fig. 4, "EROR" should read --ERROR--.

COLUMN 2

Line 26, "tie" should read --the--;
Line 55, "heat" should read --beat--.

COLUMN 3

Line 43, "to displacement" should read --upon displacement of--.

COLUMN 4

Line 50, "Invention," should read --invention,--;
Line 52, "a," should read --a--;
Line 66, "firs" should read --first--.

COLUMN 5

Line 2, "Interference" should read --interference--.

UNITED STATES PATENT AND TRADEMARK OFFICE
CERTIFICATE OF CORRECTION

PATENT NO. : 5,818,588

DATED : October 6, 1998

INVENTOR(S): TAKAHIRO MATSUMOTO ET AL.

It is certified that error appears in the above-identified patent and that said Letters Patent is hereby corrected as shown below:

COLUMN 6

Line 41, "Depending of" should read --Depending on--.

COLUMN 7

Line 25, "changes;" should read --changes,--.

COLUMN 8

Line 13, "representative one of them." should read --as a representative application.--;
Line 26, "cornier" should read --corner--;
Line 32, "priest" should read --prism--.

COLUMN 9

Line 67, "mart" should read --mark--.

COLUMN 10

Line 61, "water" should read --wafer--.

COLUMN 11

Line 23, "riot" should read --not--.
Line 40, "As" should read --as--.

UNITED STATES PATENT AND TRADEMARK OFFICE
CERTIFICATE OF CORRECTION

PATENT NO. : 5,818,588

DATED : October 6, 1998

INVENTOR(S): TAKAHIRO MATSUMOTO ET AL.

It is certified that error appears in the above-identified patent and that said Letters Patent is hereby corrected as shown below:

COLUMN 12

Line 14, "$(4\pi\Delta X_1/P)/\}\cos$" should read --$(4\pi\Delta X_1/P)/\{\cos$--.

COLUMN 13

Line 23, "may" should read --may be--.

COLUMN 14

Line 3, "Phase" should read --phase--.

Signed and Sealed this

Thirteenth Day of July, 1999

Attest:

Q. TODD DICKINSON

*Attesting Officer*    *Acting Commissioner of Patents and Trademarks*